No. 635,873. Patented Oct. 31, 1899.
E. B. SHEARER.
BICYCLE SUPPORT.
(Application filed Apr. 15, 1899.)
(No Model.)
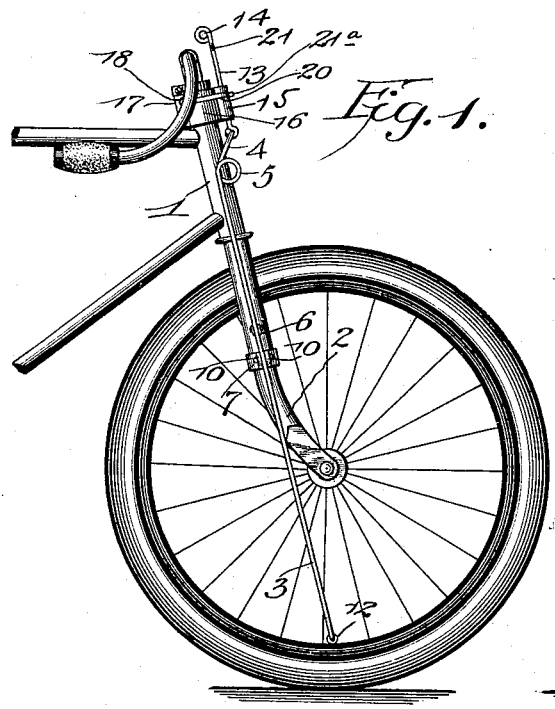
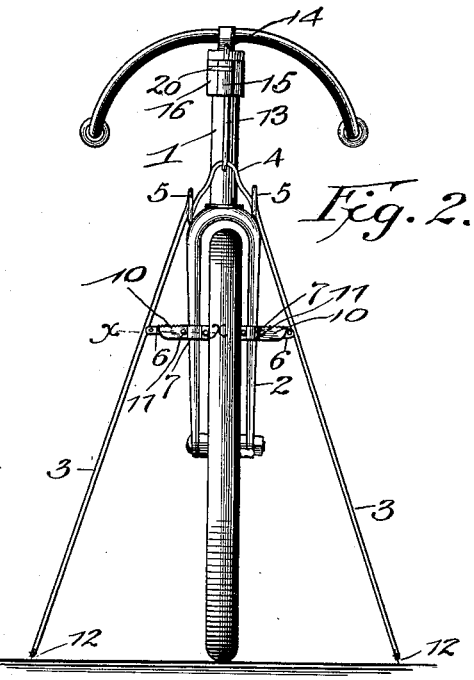
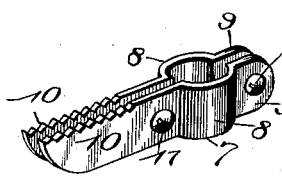
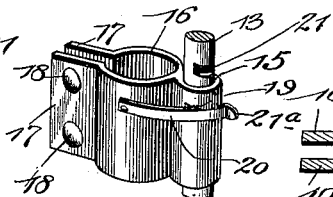
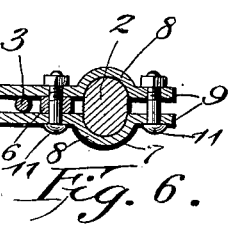
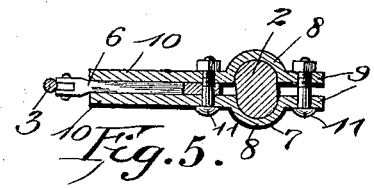
Witnesses
E. B. Shearer, Inventor.
By his Attorneys,

UNITED STATES PATENT OFFICE.

EDWARD B. SHEARER, OF VAN VLEET, MISSISSIPPI, ASSIGNOR OF ONE-HALF TO JOHN A. BARNETT, OF SAME PLACE.

BICYCLE-SUPPORT.

SPECIFICATION forming part of Letters Patent No. 635,873, dated October 31, 1899.

Application filed April 15, 1899. Serial No. 713,132. (No model.)

*To all whom it may concern:*

Be it known that I, EDWARD B. SHEARER, a citizen of the United States, residing at Van Vleet, in the county of Chickasaw and State of Mississippi, have invented a new and useful Bicycle-Support, of which the following is a specification.

This invention relates to bicycle-supports of that class which are carried upon the frame of the bicycle in readiness for use at all times, and has for its object to provide a simple and improved device which is adapted to be mounted upon the front forks of a bicycle in convenient reach of the rider and capable of supporting the bicycle while the rider remains seated thereon.

To this end the present invention consists in the combination and arrangement of parts, as will be hereinafter more fully described, shown in the accompanying drawings, and particularly pointed out in the appended claims.

In the drawings, Figure 1 is an elevation of a portion of a bicycle having the improved support applied thereto and elevated, as when not in use. Fig. 2 is a front elevation showing the device in engagement with the ground and supporting the bicycle. Fig. 3 is a detail perspective view of one of the clamps to which the legs are pivotally swung. Fig. 4 is a detail perspective view of the guide and catch for the operating-rod. Fig. 5 is a transverse sectional view taken on the line *x x*, Fig. 2. Fig. 6 is a similar view, the legs being in elevated position.

Corresponding parts are designated by like reference characters in all the figures of the drawings.

Referring to the accompanying drawings, 1 designates the head-tube, and 2 the front forks of a bicycle of common or ordinary form, this portion of the frame thereof being shown in the drawings to facilitate the understanding of the invention as hereinafter described.

The leg-standards of the device are formed from a single rod or bar of metal bent intermediate of its ends, forming the opposite legs 3, which are disposed in the same transverse plane. The bend between the legs forms a tongue 4, which is deflected forward away from the head-tube of the bicycle, and each leg at its upper end is twisted into a spring-coil 5. Each leg is provided intermediate of its ends with a link 6, suitably pivoted to the leg and supported upon a clamp 7, provided upon the adjacent member of the front forks of the bicycle-frame. As illustrated in Fig. 3, the clamp comprises two duplicate members, each of which is in a single piece having the bowed half-band portion 8, provided with an ear 9 upon one side and the straight spring-wing 10 at the opposite side. Two such members are assembled together, having their bowed band portions embracing the respective member of the fork 2, and suitable bolts or screws 11 are passed through the opposite ears 9 and the wings 10 close to the band portion and upon opposite sides of the fork member, whereby the clamp is fitted to the latter. The wings 10 are adapted to be spaced apart and extend outward from the forks in opposite directions. The links 6, which are carried by the legs, are received between the wings of the respective clamps 7 and are pivoted to the bolt 11, which passes through the wings. It will be understood that as the links 6 are pivoted at opposite ends to the legs and to the clamps 7, respectively, the legs are capable of a vertical movement upon the pivotal connection of the links, with the forks as a center. By reference to Fig. 1 it will be seen that when the device is not in use the legs are drawn upward and the links assume a vertical position alongside of the forks 2 and the legs are drawn inward thereby, also alongside of the forks, being received between the wings of the respective clamps 7, whereby the legs are held against being accidentally thrown downward into engagement with the ground. The elevated position of the legs just described is that in which the device is placed when the bicycle is being ridden and the support is not in use.

To throw the device into position for use, the rider presses downward upon the bend or tongue 4, which forces the legs downward, and as the links fall outward the legs are spread apart until the links assume a horizontal position, extending outward and clamped between the wings 10 of the clamp 7. In this position the lower ends of the legs are engaged with the ground and spread apart to afford a stable support, and the links are braced against front or rear strain by being held between the wings of the clamps, and they also effectively hold the legs spread apart. When the legs are drawn upward by means of the bend 4, the links draw the legs inward into engagement with the clamps, as hereinbefore described. It is preferable to provide each leg at its lower end with a roller 12, so that the bicycle may not be stopped suddenly upon lowering the support into position for use. The spring-coils 5 are to afford a yielding movement to the legs in order that the latter may yield when they first strike the ground, and thereby prevent damage or breakage thereof.

An operating-rod 13 is connected to the bend 4 of the legs and extends upward alongside the front side of the head-tube 1 within convenient reach of the rider, where it is provided with a suitable handle 14 (shown in the drawings) by twisting the end of the rod into an eye. The rod passes through a guide 15, carried by the head-tube near the upper reach-bar of the frame of the bicycle. This guide is shown most clearly in Fig. 4 and comprises a hollow tube 15, through which the operating-rod passes, and a clamp or split sleeve 16, having opposite ears or flanges 17, through which are adapted to pass fastenings 18, whereby the guide may be clamped upon the head-tube of the bicycle-frame. A portion of one side of the guide-tube is cut away, as at 19, and a spring-catch 20 is provided upon the clamp and adapted to extend into the opening 19, provided through the guide-tube. The operating-rod 13 is provided with a notch 21 in one side thereof, which is adapted to be exposed through the opening 19 in the guide-tube, and the spring-catch 20 is adapted to automatically spring into engagement therewith when the legs of the device are thrown downward and hold the same in its operative position. The extremity of the latch is provided with a suitable thumb-piece 21ª, whereby the catch may be disengaged from the operating-rod whenever it is desired to elevate the legs of the support.

The present invention provides an exceedingly practical and effective device, as it may be applied to any of the common or well-known types of bicycles without changing or altering the frame thereof. It may be quickly fitted in place to the front forks in convenient reach of the rider, and the leg-standards are effectively braced and held steady in either the operative or inoperative positions thereof. The clamps 7, to which the leg-standards are connected by means of the link 6, are also capable of use as coasters, as the wings 10 are made long enough and project beyond the leg-standards when the latter are elevated.

Changes in the form, proportion, size, and the minor details of construction within the scope of the appended claims may be resorted to without departing from the spirit or sacrificing any of the advantages of the present invention.

Having thus described the invention, what is claimed is—

1. In a bicycle-support, the combination with opposite leg-standards, of clamps provided upon the frame of the bicycle and having spaced wings, and links pivotally connecting the leg-standards to the respective clamps, each link being pivoted at its outer end to one of the leg-standards, and at its inner end to and between the wings of the adjacent clamp, the leg-standards being located transversely between and braced by the wings of the clamps, in the inoperative position of the device, and the links being located longitudinally between and braced by the wings of the clamps, in the operative position of the device, substantially as shown and described.

2. In a bicycle-support, the combination with opposite leg-standards, of clamps fitted to the front forks of the bicycle, and comprising opposite members having wings, and fastenings to clamp the members on the forks, and links pivotally connecting the leg-standards to the clamps, each link being pivoted at its outer end to one of the leg-standards, and at its other end between the wings of the adjacent clamp and to one of the fastenings thereof, the leg-standards being located transversely between and held by the wings of the clamps, in the inoperative position of the device, and the links being located longitudinally between and braced by the wings, in the operative position of the device, substantially as shown and described.

3. In a bicycle-support, the combination with opposite leg-standards, of clamps provided upon the front forks of the bicycle, each clamp having a pair of outwardly-extending wings forming a coaster, and links pivotally connecting the leg-standards to the clamps, each link being pivoted at its outer end to one of the leg-standards, and at its inner end to and between the wings of the adjacent clamp, the leg-standards being located transversely between and braced by the wings, in the inoperative position of the device, and the links being located longitudinally between and braced by the wings, in the operative position of the device, substantially as shown and described.

4. In a bicycle-support, the combination of opposite leg-standards bent from a single length of material, the bend intermediate of the legs being deflected and forming a hand operating portion, each leg having a spring-coil twisted therein, and links pivoted to the leg-standards and to the frame of the bicycle, the spring-coils being located between the links and the hand operating portion of the device, and imparting a yielding motion thereto, substantially as and for the purpose set forth.

5. In a bicycle-support, the combination with a pair of opposite leg-standards having a vertical movement, of an upright operating-rod connected to the leg-standards, and a guide for the operating-rod, comprising a split sleeve fitted to the head-tube of the bicycle, and carrying a fixed guide-tube having a lateral opening formed therein, and a spring-catch mounted upon the split sleeve, received within the opening in the guide-tube, and adapted to engage a notch formed in the operating-rod, substantially as and for the purpose set forth.

In testimony that I claim the foregoing as my own I have hereto affixed my signature in the presence of two witnesses.

EDWARD B. SHEARER.

Witnesses:
H. F. WALLER,
J. M. MAYO.